May 11, 1926.  
W. A. MEIGHAN  
CHAIN SAW  
Original Filed April 16, 1925  
1,584,631
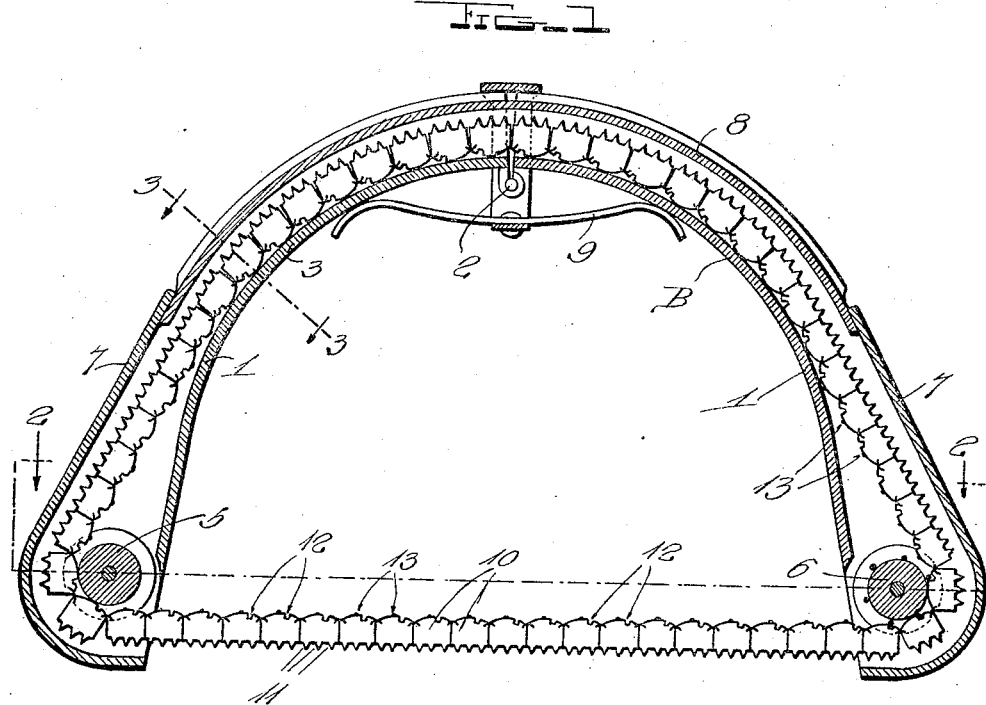
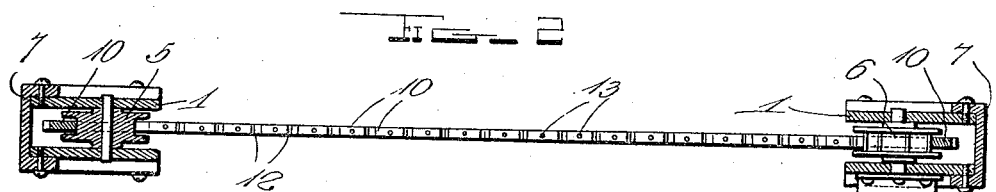
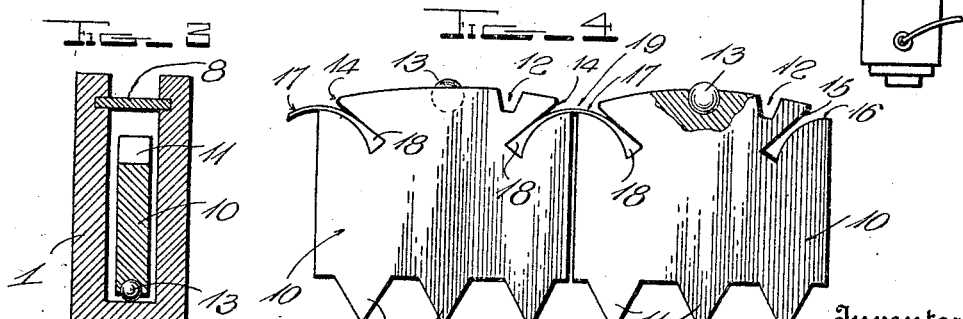
Inventor  
William A. Meighan  
By H. B. Willson & Co.  
Attorneys
Witness Patented May 11, 1926.

1,584,631

UNITED STATES PATENT OFFICE.

WILLIAM A. MEIGHAN, OF PORTLAND, OREGON.

CHAIN SAW.

Original application filed April 16, 1925, Serial No. 23,606. Divided and this application filed October 5, 1925. Serial No. 60,587.

My invention relates to improvements in chain-saws of the type disclosed in my co-pending application for portable saws, filed April 16, 1925, under Serial No. 23,606, the present application being a division of the application above identified and directed to the saw per se which is not claimed in my co-pending application.

The primary object of this invention is to provide a unique form of endless saw formed of yieldably connected sections, any of which may be readily detached so that new sections may be inserted whenever desired, and to permit ready separation or disengagement of the saw from a log if the latter shows a tendency to pinch the saw.

With the foregoing and minor objects in view, the invention resides in the novel subject matter hereinafter described and claimed, the description being supplemented by the accompanying drawing.

Figure 1 is a sectional view illustrating the application of this continuous saw to a frame such as is embodied in my co-pending application.

Figure 2 is a sectional view taken substantially on the line 2—2 of Fig. 1.

Figure 3 is a cross sectional view taken substantially on the line 3—3 of Fig. 1; and Figure 4 is a detail elevation of a portion of the continuous saw showing the manner of connecting the sections.

In the accompanying drawing, I have illustrated a frame comprising a bow B made up of two halves or sections 1 which are hinged together at 2 at the inner periphery of said bow. Each section is channel-shaped in cross section and includes an inner wall 3 which terminates short of the free ends of the bow. One of these free ends carries a roller 5 while the other mounts a toothed roller 6 which has driving connection to a continuous saw. A pair of channel-shaped guards 7 enclose the outer sides of the bow sections to points spaced from the center, this central portion being closed by means of a flexible strip 8 whose longitudinal side edges are set into grooves formed in the inner faces of the parallel flanges of said channel-shaped member. A spring member 9 is arranged to exert an outward pressure upon the two halves so as to retain the continuous saw member taut at all times. The foregoing structure briefly described comprises the subject matter of my co-pending application and is not claimed herein.

This saw comprises a plurality of saw sections 10 which are yieldably interconnected by means of springs 17 as shown in Fig. 4. Each of these saw sections 10 is preferably formed from a flat metal plate and is provided along one edge with cutting teeth 11 while its opposite edge is curved outwardly throughout its length and has a notch 12 formed therein for the reception of a tooth of the aforementioned toothed roller 6 so as to form a driving connection as is quite clear. Preferably, though not necessarily, the curved edge is also provided with a ball bearing 13 which bears against the inner wall 3 of the channeled bow members so as to reduce friction. Each section 10 is provided with a pair of slots 14 which converge toward the toothed edge of said section from the point of juncture of the curved edge and the parallel ends. Preferably, the outer wall 15, that is the one adjacent the curved edge is straight, while the other wall 16 of the slot 14 is curved away from the straight wall toward the opposite ends, thereby forming a substantially double dove-tail slot. By reference to Fig. 4 of the accompanying drawing, the result of curving the inner wall 16 of each slot 14 will be noted. In connecting a pair of these sections 10, a curved spring member 17 having headed or substantially dove-tailed ends 18 is employed, the heads or dove-tailed portions being snugly fitted into the slots 14 and removably fixed therein so as to permit ready separation and removal of any section from the continuous saw. Through extending the straight wall 15 of each slot 14 to the curved edge of each section, a space 19 is created between the sections on assembly so as to permit straightening of the spring member 17 as the saw sections pass over the rollers 5 and 6.

Certain minor changes in the details of construction may be resorted to and such of these changes as may fall within the scope of the appended claims, I consider within the spirit of my invention.

I claim:

1. A continuous saw formed of separate sections and separate spring devices connecting adjacent ends of the sections.

2. A continuous saw formed of sections disposed in end to end relation and provided in their ends with slots, and springs for connecting the saw sections, said springs having their ends secured in said slots.

3. A continuous saw formed of sections disposed in end to end relation and provided in their ends with dove-tail slots, and springs for connecting the saw sections, said springs having dove-tail ends received in said dove-tail slots.

4. A continuous saw formed of sections disposed in end to end relation, each section having one side edge curved outwardly and provided at its ends with diagonal slots converging toward the opposite edge, and springs having their ends removably fixed in the slots to interconnect the sections.

5. A section for a continuous saw comprising a body portion having teeth on one edge and having its other edge curved outwardly throughout its length, said section having parallel ends and diagonal slots opening through the curved edge at its juncture with said ends.

6. A structure as specified in claim 5; one wall of each slot being straight, the other wall being curved away from the straight wall toward its opposite end whereby to form a slot having substantially dove-tailed ends.

In testimony whereof I have hereunto affixed my signature.

WILLIAM A. MEIGHAN.